United States Patent
Lal et al.

(10) Patent No.: US 8,575,867 B2
(45) Date of Patent: Nov. 5, 2013

(54) ELECTRIC FIELD-GUIDED PARTICLE ACCELERATOR, METHOD, AND APPLICATIONS

(75) Inventors: Amit Lal, Ithaca, NY (US); Shi Yue, Ithaca, NY (US)

(73) Assignee: Cornell University, Ithaca, NY (US)

(*) Notice: Subject to any disclaimer, the term of this patent is extended or adjusted under 35 U.S.C. 154(b) by 194 days.

(21) Appl. No.: 13/132,993

(22) PCT Filed: Dec. 3, 2009

(86) PCT No.: PCT/US2009/066517
§ 371 (c)(1),
(2), (4) Date: Aug. 26, 2011

(87) PCT Pub. No.: WO2010/065702
PCT Pub. Date: Jun. 10, 2010

(65) Prior Publication Data
US 2012/0037814 A1    Feb. 16, 2012

Related U.S. Application Data

(60) Provisional application No. 61/193,533, filed on Dec. 5, 2008.

(51) Int. Cl.
*H01J 25/00* (2006.01)

(52) U.S. Cl.
USPC ........... 315/500; 315/501; 315/502; 315/503; 315/504; 315/505; 315/506; 315/507; 315/111.61; 250/396 R; 250/492.2; 250/306; 250/423 F; 250/310; 250/307; 250/396 ML; 250/492.3; 313/160; 313/154; 313/309

(58) Field of Classification Search
USPC ........... 315/500–507; 313/160; 250/306, 407, 250/310, 396 ML, 307
See application file for complete search history.

(56) References Cited

U.S. PATENT DOCUMENTS

| | | | |
|---|---|---|---|
| 2,903,578 A | 9/1959 | Gallop |
| 2,907,884 A | 10/1959 | Gale |
| 3,218,562 A | 11/1965 | Serduke |

(Continued)

FOREIGN PATENT DOCUMENTS

| | | | |
|---|---|---|---|
| JP | 04308696 A | 10/1992 |
| JP | 06068994 A | 3/1994 |

OTHER PUBLICATIONS

Logan et al, Inertial Fusion Energy Development Approaches for Direct and Indirect-Drive, 16th IAEA Fusion Energy Conf., Oct. 1996.

(Continued)

*Primary Examiner* — Daniel Cavallari
*Assistant Examiner* — Srinivas Sathiraju
(74) *Attorney, Agent, or Firm* — William Greener; Bond, Schoeneck & King, PLLC (57) ABSTRACT

A charged particle accelerator having a curvilinear beam trajectory maintained solely by a laterally directed, constant electric field; requiring no magnetic field. A method for controlling the trajectory of a charged particle in an accelerator by applying only a constant electric field for beam trajectory control. Curvilinear steering electrodes held at a constant potential create the beam path. A method for making a chip-scale charged particle accelerator involves integrated circuit-based processes and materials. A particle accelerator that can generate 110 KeV may a footprint less than about 1 cm$^2$.

30 Claims, 12 Drawing Sheets

(56) References Cited

U.S. PATENT DOCUMENTS

| | | | |
|---|---|---|---|
| 3,351,793 A | 11/1967 | Steimel | |
| 3,407,323 A | 10/1968 | Hand | |
| 3,506,865 A | 4/1970 | Briggs | |
| 3,883,761 A | 5/1975 | Hendry | |
| 3,921,019 A | 11/1975 | Karasawa | |
| 4,063,125 A | 12/1977 | Tran et al. | |
| 4,189,346 A | 2/1980 | Janagin | |
| 4,200,844 A | 4/1980 | Nunan | |
| 4,246,067 A | 1/1981 | Linlor | |
| 4,639,348 A | 1/1987 | Janagin | |
| 4,937,531 A | 6/1990 | Odera | |
| 5,073,913 A | 12/1991 | Martin | |
| 5,399,873 A * | 3/1995 | Takafuji et al. | 250/492.3 |
| 6,433,494 B1 | 8/2002 | Kulish et al. | |
| 7,315,140 B2 | 1/2008 | Sasaki et al. | |
| 7,466,085 B2 | 12/2008 | Nutt | |
| 7,476,883 B2 | 1/2009 | Nutt | |
| 7,973,485 B1 * | 7/2011 | Brown et al. | 315/111.61 |
| 8,044,351 B2 * | 10/2011 | Kim et al. | 250/310 |
| 8,063,380 B2 * | 11/2011 | Levin et al. | 250/370.13 |
| 8,115,168 B2 * | 2/2012 | Muray et al. | 250/307 |
| 8,242,674 B2 * | 8/2012 | Sellmair | 313/160 |
| 2007/0114903 A1 | 5/2007 | Tolmachev et al. | |
| 2009/0033249 A1 | 2/2009 | MacDonald-Bradly | |
| 2011/0248179 A1 * | 10/2011 | Matesa et al. | 250/396 ML |

OTHER PUBLICATIONS

Logan et al; Inertial Fusion Energy Development Approaches for Direct and Indirect-Drive; Lawrence Livermore National Laboratory, Livermore, California; Aug. 20, 1996; pp. 1-6.

* cited by examiner

ELECTRIC FIELD-GUIDED PARTICLE ACCELERATOR, METHOD, AND APPLICATIONS

RELATED APPLICATION DATA

The instant application claims priority to U.S. Provisional application Ser. No. 61/193,533 filed on Dec. 5, 2008, the subject matter of which is incorporated herein by reference in its entirety.

BACKGROUND

1. Field of the Invention

Embodiments of the invention generally relate to the field of charged particle or atomic beam (hereinafter 'particle') accelerators and, more particularly, are directed to a particle accelerator having a particle pathway controlled only by a lateral electric field (and an optional magnetic field); integrated circuit (e.g. CMOS, or bi-CMOS integrated circuit) wafer and die-scale, lateral electric field-guided particle accelerators; and associated methods and applications.

2. Discussion of Related Technology

Conventional fusion reactors using magnetic and inertial confinement are necessarily of large size, typically that of a large building or hundreds of meters long.

'Table-top' accelerators using laser-produced plasmas to generate high electric field gradients (wakefields) to accelerate the ions within have been reported. However, these require the use of high intensity lasers having an input power exceeding $2 \times 10^{18}$ W/cm$^2$. Such high energy input would make such an energy-generating device improbable. Thus device bulkiness and cost for fusion reactors represent some of the challenges in making these devices practical.

A reported, relatively low-cost fusion device known as the Magnetized Target Fusion Project involves plasma containment using superconducting magnets. These magnets, however, are energy-expensive to maintain at their low operating temperatures.

In 2005, a group at Rensselaer Polytechnic Institute reported the use of pyroelectric crystals to ionize gas, accelerating the ions up to 200 keV and inducing fusion in Deuterium-Deuterium reactions. However their device required the crystals to be heated to a high enough temperature to boil off electrons on their surfaces, which is not energy-efficient.

The inventors have recognized a need for, and the many advantages and benefits obtainable from, a charged particle accelerator having reduced volume, high efficiency, requiring less input energy than conventional apparatus, not requiring supercooling or heating, and not requiring a magnetic field (and the associated magnets) for particle confinement. Such a device manufactured using conventional integrated circuit and lithography-based micro- and nano-fabrication processes and thus being referred to herein as 'chip-scale,' may make possible a small, portable fusion battery as well as provide useful applications in medical therapy, explosive detection, radioactive materials detection, and others.

These and other advantages and benefits may be achieved by the embodied invention, which will be described in detail below and with reference to the drawings.

SUMMARY

An embodiment of the invention is directed to a charged particle accelerator fabricated on a 1.5-8 centimeter (cm) (total side length or diameter) chip that can accelerate ions (e.g. deuterium, protons) to energies in the low MeVs. The particle accelerator has a curved particle pathway (ion channel) created by a pair of opposing, spaced, curvilinear electrodes (hereinafter, pairs of electrodes will be referred to as 'electrodes') operated at a constant potential so as to exert a constant, laterally-directed (centripetal) electric field (E) on the particle traveling in the particle pathway. Using such electrodes allows the traveling particle (technically, beam packets) to be confined to a specified trajectory having a very tight radius of curvature, for example, equal to or less than 4 cm and, in an exemplary aspect less than 0.7 cm. The force on an ion can be written as $F=qv \times B+qE$ where q is the ion charge, v is the velocity, B is the magnetic field, and E is the electric field. In the absence of the magnetic field B, an electrical field E can apply forces in the direction of the electric field. In the curvilinear electrode case disclosed herein, the ion (particle) is forced to travel in a curvilinear path as long as the electric field has the proper magnitude and direction. Note that, if the B field is normal to the wafer surface, the magnetic field can also apply forces normal to the ion travel direction, hence turning the ion towards the desired direction. However, in the embodiments described herein, the magnetic field is not necessary, enabling just the use of electric fields to bend the ion paths. The particle pathway may be circular, spiral, or otherwise curvilinear. One or more particle pathways each have at least one entry region and may have an exit region. Charged particles produced by a suitable source are input to the accelerator via a particle entry pathway connected to the particle pathway, that includes one or more DC guide electrodes for guiding the particle into the particle pathway. Various aspect of the accelerator include one or more oscillating E field produced by accelerating electrodes that accelerate the particle traveling in the particle pathway. According to various aspects, the accelerator may have one or more curvilinear particle pathways and associated curvilinear steering electrodes that are operated at constant potential. It will be appreciated that if the particle is sufficiently accelerated each time it passes through an accelerating electrode, it will travel with increased velocity thus requiring an increasingly larger radius trajectory. As such, a stronger centripetal E field will be required to maintain the particle trajectory. Therefore, if the accelerator has a single curvilinear particle pathway, then on each round trip the fixed, DC voltage applied to the steering electrodes will be increased, but remain fixed for that velocity parameter. In aspects where there are multiple particle pathways, each particle pathway electrode will be operated at a different, fixed DC voltage. In various aspects, the range of fixed, DC steering electrode voltages will typically be between about 100-350 V and may be operated at maximum value before electrical breakdown of the gases in the channel, which depends on electrode gap spacing and pressure following the well known Paschen theory of gas breakdown. In various aspects, the accelerator may include timing circuits, feedback control circuits, and one or more beam focusing lenses (e.g., electro-magnetic lens). According to an aspect, the accelerator may be disposed between two magnets that exert a constant magnetic field transversely through the substrate that further acts to control particle trajectory. According to an illustrative aspect, the accelerator is fabricated on a conducting, doped silicon, planar substrate via integrated circuit processing.

A related embodiment of the invention is directed to a method for controlling the path of a charged particle in a particle accelerator. The method involves applying a constant voltage across a pair of curvilinear steering electrodes so as to exert only a constant, laterally-directed electric field (E) (directed perpendicular to the direction of charged particle motion) on the charged particle traveling in a particle pathway defined by the channel formed by the curvilinear steering electrodes. According to an aspect, a constant, transversely-directed magnetic field may be exerted on the charged particles traveling in the pathway. In an illustrative aspect, the method involves steering the traveling charged particles in a curvilinear trajectory having a radius equal to or less than one centimeter. In practice, achieving a radius of curvature <1 cm using only magnetic fields would require magnetic fields on the order of 9-10 T, which would be impractical for small scale implementation. An embodiment of the invention is directed to a method for making a chip-scale particle accelerator. According to an aspect, the accelerator can be made using standard integrated circuit processes and materials. In a non-limiting aspect, ion channels (particle pathways) and curvilinear steering electrodes may be patterned in one layer with connecting vias on a bottom layer, using SOI or LIGA wafers with high aspect ratio electrodes on a RF-integrated circuit wafer. A top insulator could be bounded and the device then packaged in vacuum. According to a non-limiting aspect, beam-focusing permanent magnets could be initially bounded on top of the first layer.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIGS. 8a, b schematically illustrate a quadrupole magnetic lens applicable for beam focusing, according to an illustrative aspect of the invention;

FIGS. 10(a-g) illustrate integrated circuit-based process steps for making an accelerator, according to an exemplary embodiment of the invention;

FIGS. 11a, b schematically show circuit pattern traces for a integrated circuit-based accelerator, according to an illustrative aspect of the invention;

DETAILED DESCRIPTION OF EXEMPLARY EMBODIMENTS OF THE INVENTION

Figure 1:
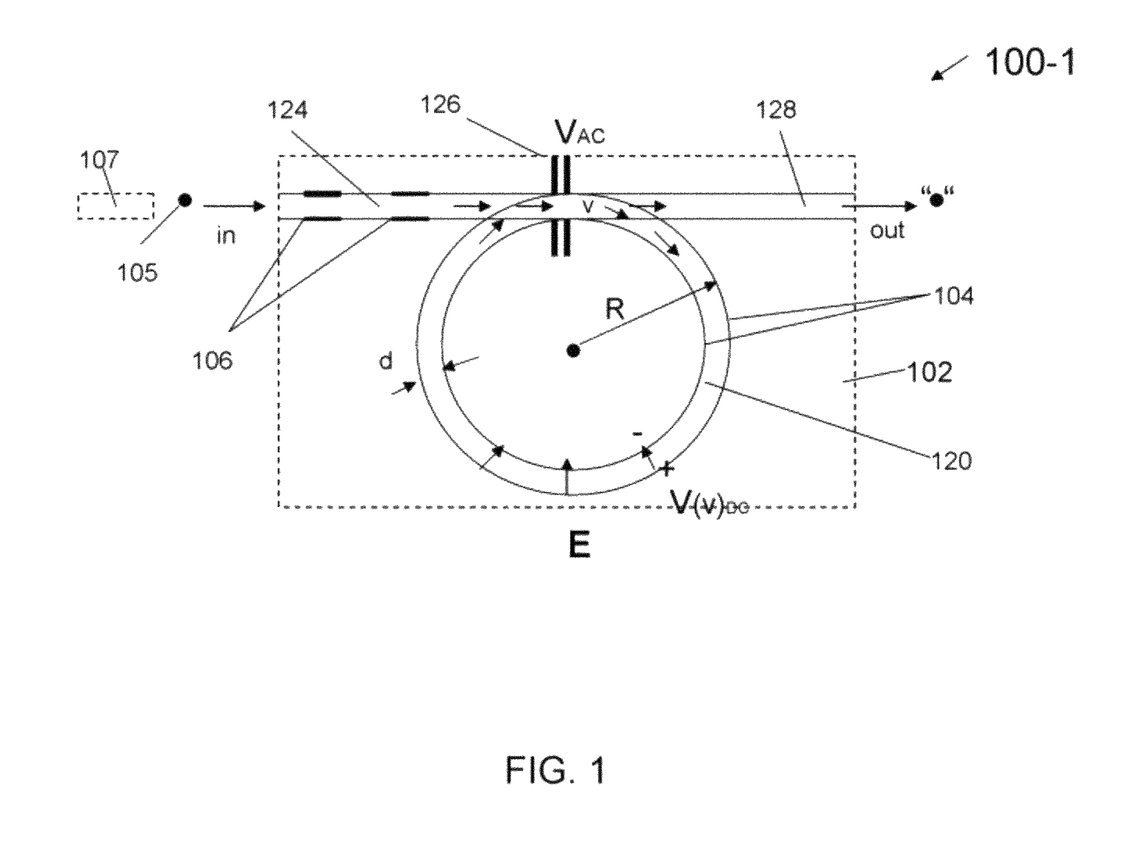
FIG. 1 shows a schematic, top plan view of a particle accelerator design according to an illustrative embodiment of the invention.

FIG. 1 schematically shows a charged particle accelerator 100-1 according to an exemplary embodiment of the invention. The accelerator includes an accelerator support structure 102 having a principal plane orientation that lies in the plane of the paper as shown. Plan views of the accelerator referred to below will be viewed as looking down onto the principal plane. A single pair of opposing, spaced, curvilinear steering electrodes 104 is disposed in the support structure. The electrodes have a gap, d, there between, which defines a particle pathway (or ion channel) 120 in the support structure. Although the electrodes/path are shown as circular, the invention is not limited to this curvilinear shape. The accelerator further includes a linear, charged particle entry pathway 124 in the support structure connected to the particle pathway. A suitable charged particle source 107 shown in dotted lines (not a part of the invention per se) provides a charged particle 105 for input to the entry pathway. One or more pairs of guiding electrodes 106 operated at $V_{DC\text{-}guide}$ are used to guide the charged particle through the entry pathway. A pair of particle acceleration electrodes 126 is shown disposed in the entry pathway where it adjoins the particle pathway. The acceleration electrodes operate at an applied AC voltage ($V_{AC\text{-}accel}$) at radio frequency RF to accelerate the charged particle 105 as it passes there through where it is accelerated to a velocity v. A constant voltage $V_{DC\text{-}steer}$ is applied to the steering electrodes 104 to create a constant, laterally-directed (i.e., radially inward-pointing or centripetal) electric field E that exerts a centripetal force $F_\perp = qE_\perp$ (where q is the charge on the particle) on the particle traveling along the particle pathway 120 to maintain the particle trajectory in the ion channel. As such, the particle trajectory is completely dictated by an electric field; no magnetic field is present as it would be in a conventional cyclotron.

Figure 2:
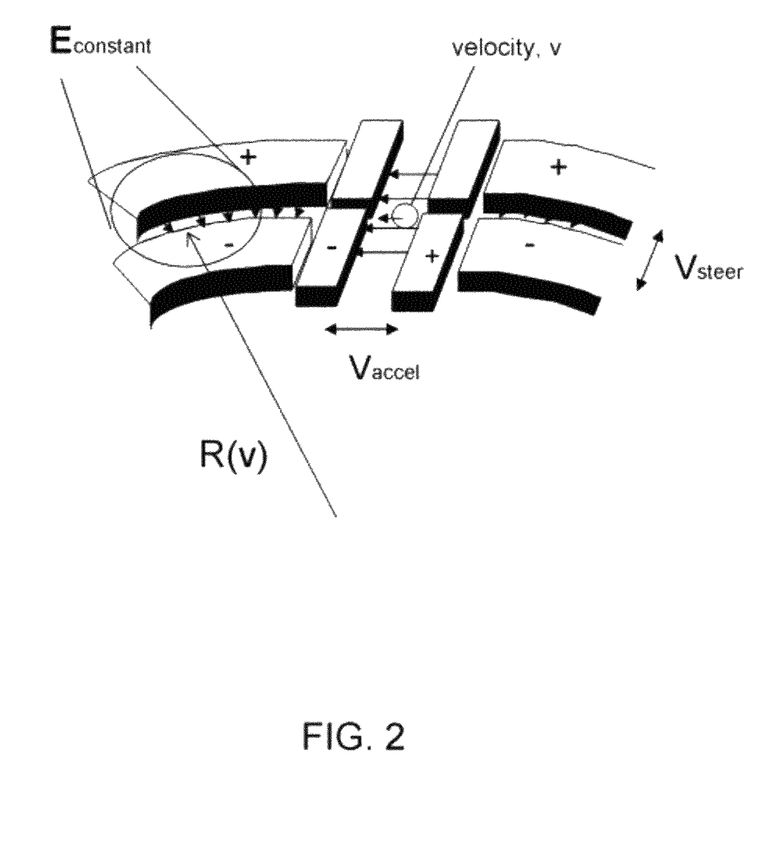
FIG. 2 shows a schematic, perspective view of a segment of a particle accelerator including steering electrodes and acceleration electrodes, according to an illustrative embodiment of the invention.

FIG. 2 schematically shows the set-up of the steering electrodes and the accelerating electrodes and illustrates the central concept of the embodied invention. As in a linear accelerator, the ion is accelerated through $V_{accel}$ as it passes there through. After the acceleration, the ion is kept in a curvilinear path by the steering electrodes, which induce an E field perpendicular to the direction of particle motion. The accelerating electrodes do the work of the device just as in the linear accelerator case. These electrodes are driven at RF at peak potential $V_{accel}$, such that the ion sees the maximum E field when it is at the midpoint of the electrodes. Hence the ion should arrive at the first accelerating electrode slightly before the voltage peak to be perfectly in sync. Every time it goes through such an accelerating electrode pair it will gain energy and, for a non-relativistic charged particle, its speed after will be $$|v| = \sqrt{\frac{2q(V_{in} + n \cdot V_{accel})}{m}} \qquad (1)$$

where m is the ion mass, $V_{in}$ is the equivalent initial energy the ion entered accelerator with, and n is the number of times it has been given a push of $V_{accel}$. With no magnetic field present, the radius of a circular trajectory will be $$r(|u|) \approx \frac{m}{qE_\perp} \frac{2qnV_{accel}}{m} = \frac{2nV_{accel}}{E_\perp} \qquad (2)$$

Thus with no magnetic field, the radius of curvature only depends on the specific particle energy at a given time, with no dependence (in theory) on particle mass. The total size of the device then only depends on the radius corresponding to the highest energy.

In the instant illustrative aspect in which the accelerator includes only a single curvilinear particle pathway 120 of radius R formed by single electrode pair 104, it will be appreciated that each time the particle 105 crosses the accelerating electrodes 126, its velocity, v, will increase. Thus a stronger lateral E field will be required to maintain the fixed particle trajectory. In this case, the constant voltage $V_{DC\text{-}steer}$ applied to the steering electrodes will change (increase) as a function of changing (increasing) particle velocity, v, with each round trip taken by the particle until the desired energy of the particle is achieved and the particle exits the accelerator via exit pathway 128.

A non-limiting object of the embodied invention is to minimize the size of the accelerator. Since the magnitude of the centripetal force keeping the ion in curvilinear trajectory is key to reducing device area, $V_{DC\text{-}steer}$ can be chosen to be as high as breakdown voltage will allow at vacuum.

According to an aspect, the particle accelerator 100-1 may operate as an X-ray source if electrons are allowed to travel at constant velocity round-and-round the particle pathway without exit. In such an aspect, the constant voltage applied to the steering electrodes would not change.

Figure 3:
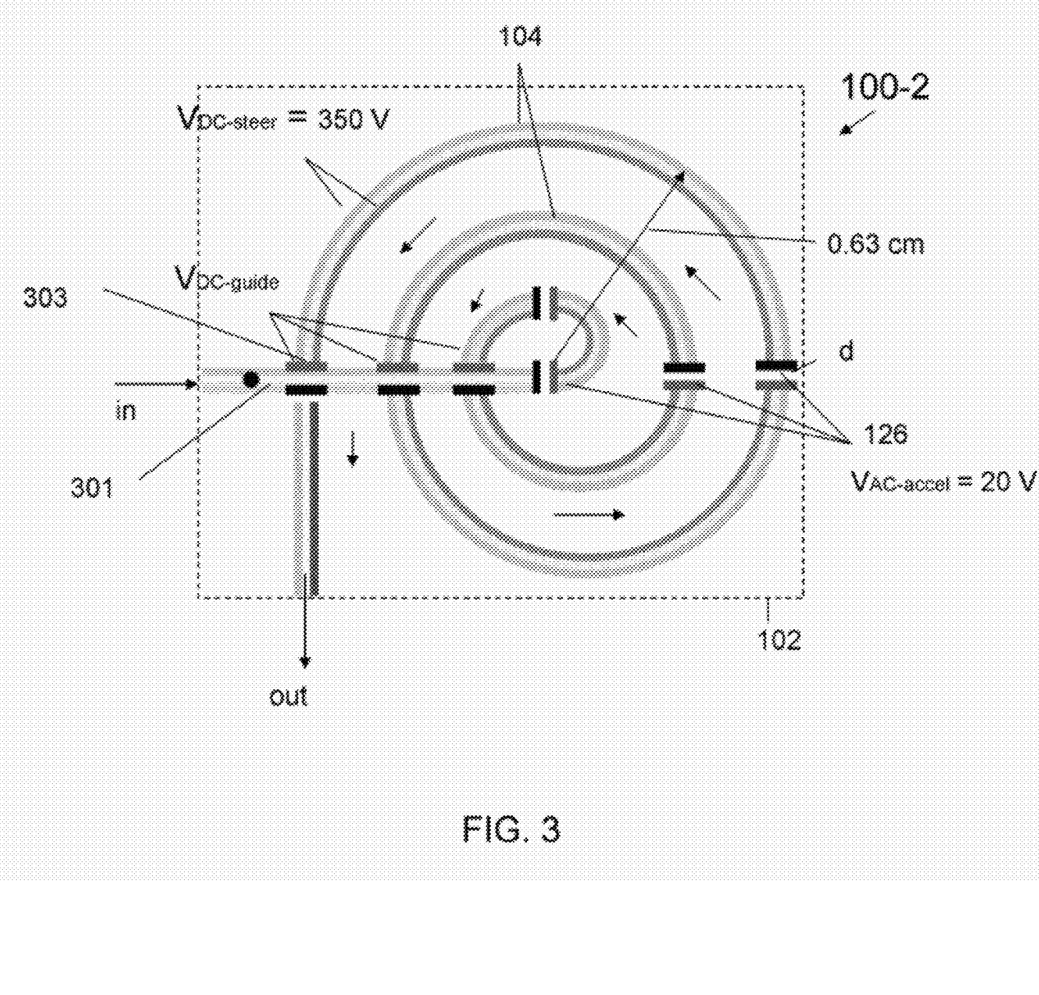
FIG. 3 shows a schematic, top plan view of a particle accelerator according to an aspect of the invention.

FIG. 3 illustrates an alternative, non-limiting design aspect of an accelerator 100-2 having a spiral particle pathway according to an exemplary aspect of the invention. It is known that accelerating deuterium to 110 KeV will enable a fusion reaction with tritium as follows:

$$_1^2D + _1^3T \rightarrow _2^4He + n^0 + 17.6 \text{ MeV}$$

Thus according to Equ. (1) and (2), n=110 keV/$V_{accel}$, which for this example is on the order of 5000. The total radius of the device at $V_{accel}$ 20V is 0.63 cm. Other parameters of the example illustrated in conjunction with FIG. 3 include $V_{DC\text{-}steer}$=350 V; $V_{DC\text{-}steer}$ electrode gap spacing=10 μm; ion channel depth ~10 μm; $V_{AC\text{-}accel}$=20 V; $V_{AC\text{-}accel}$ electrode gap spacing=200 μm.

As further illustrated in FIG. 3, the device 100-2 includes a plurality of pairs of opposing, spaced, curvilinear steering electrodes 104 disposed in a support structure 102. Each pair of steering electrodes has a particle entry end 301 and a particle exit end 303. A plurality of pairs of particle acceleration electrodes 126, are each disposed between an exit end of an $n^{th}$ steering electrode and an entry end of an $n^{th}$+1 steering electrode.

The concept of the entire design can be transferred to other ions, e.g., protons. With the same electrical parameters, protons can be accelerated to 675 KeV on a device with an 8 cm diameter. This energy may be of interest because the aneutronic fusion reaction $$p^+ + ^{11}B \rightarrow 3\,^{12}C + 8.7 \text{ MeV}$$

has a high cross-sectional peak. This may be useful in certain applications for a fusion power generator without a highly penetrating neutron byproduct.

Figure 4:
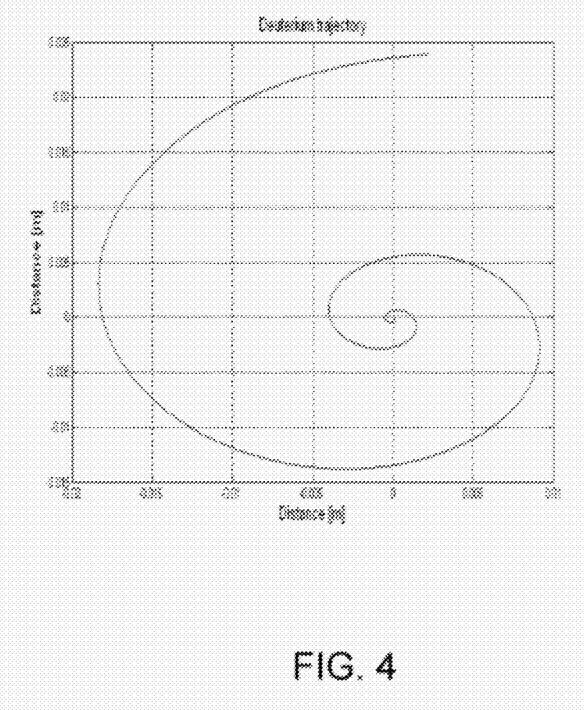
FIG. 4 is a graphical representation of a non-circular particle trajectory due to accelerator electrode interval spacing, according to an illustrative aspect of the invention.

As shown in FIG. 3, the general design is circular-spiral, with accelerating electrodes placed at every half-turn. Every time the particle it is accelerated, the radial path will change according to Equ.(2), and v according to Equ.(1), as the frequency f remains constant. Thus a spiral trajectory is formed. The shape of the spiral depends on the distance interval between consecutive accelerating electrodes; i.e., from an near-Archimedean spiral (e.g., FIG. 3) to one that is more hyperbolic (due to pathway segments between accelerating electrodes having centers of curvature not aligned) as illustrated in FIG. 4. Although the circular and hyperbolic shapes aim to conserve device area, the frequency at which the acceleration electrodes must be driven will be higher, which may require greater power consumption. The spacing interval between the pairs of the $V_{AC\text{-}accel}$ electrodes can be made in consideration of the driving frequency $$f = \frac{v}{2\pi k},$$

where k is an integer or fractional number of cycles the ion goes through at v in a constant radial path before the next acceleration. In the configuration shown in FIG. 3, k would be ½. In order to reduce the required driving frequency of the acceleration electrodes, the particle pathway and steering electrode configurations could be made to allow for the ion to remain in a circular ring path for k times before the next acceleration. In this way, f may be reduced by k. According to the instant aspect, each particle (and pathway or ion channel) should complete a circular path after each acceleration. For guidance of ions with a constant energy around a generally curvilinear path (not perfectly circular) the potential at the guidance electrodes could be altered accordingly to reflect the change in radius of curvature.

Figure 5:
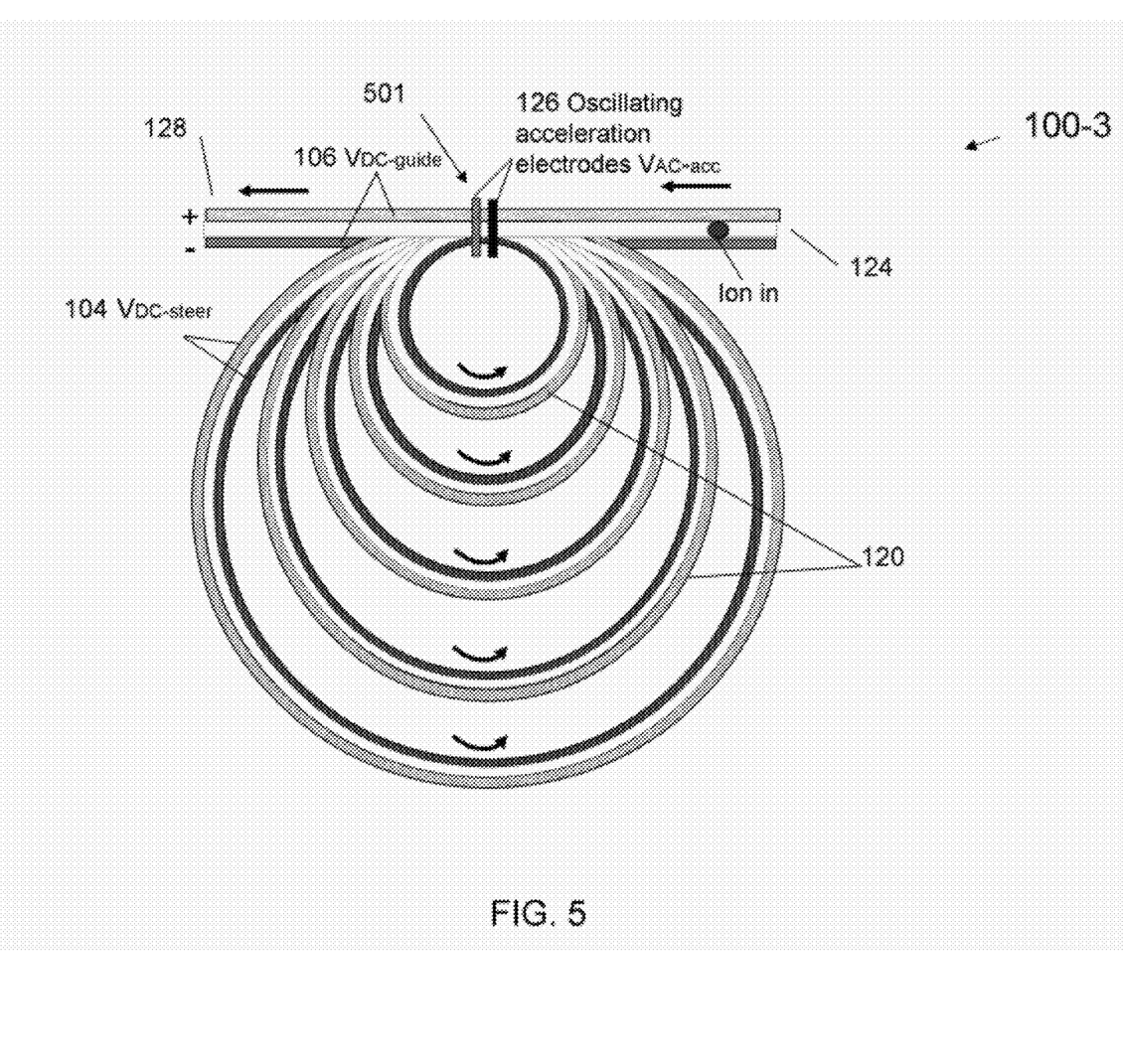
FIG. 5 shows a schematic, top plan view of a particle accelerator according to another aspect of the invention.

FIG. 5 schematically illustrates a particle pathway and steering electrode configuration aspect of an accelerator 100-3 that facilitates lower acceleration electrode driving frequency operation as discussed immediately above. As illustrated, the accelerator includes a plurality of opposing, spaced, curvilinear steering electrodes 104 disposed in the support structure (not shown), each having a different radius and a common particle entry/exit region 501. The accelerator requires only a single pair of RF acceleration electrodes 126, which is disposed in the common particle entry/exit region.

An ion first enters the entry pathway 124 from the right, being guided in a straight path by $V_{DC\text{-}guide}$ guide electrodes 106. The ion is only accelerated each time it passes through $V_{AC\text{-}accel}$ acceleration electrodes 126, after which it can stay in a circular path 120. The accelerating electrodes can be driven at frequencies $$\frac{v}{2\pi Rn},$$

where v=velocity in a circular path with radius R, and n is an integer number of times the ion goes around each circular path. Hence the frequency can be adjusted and the power minimized. The ion is thus momentarily "stored" in each circular particle pathway. An exit path 128 includes $V_{DC-guide}$ guide electrodes that allow the ion to move in a straight path out of the accelerator.

Figure 6:
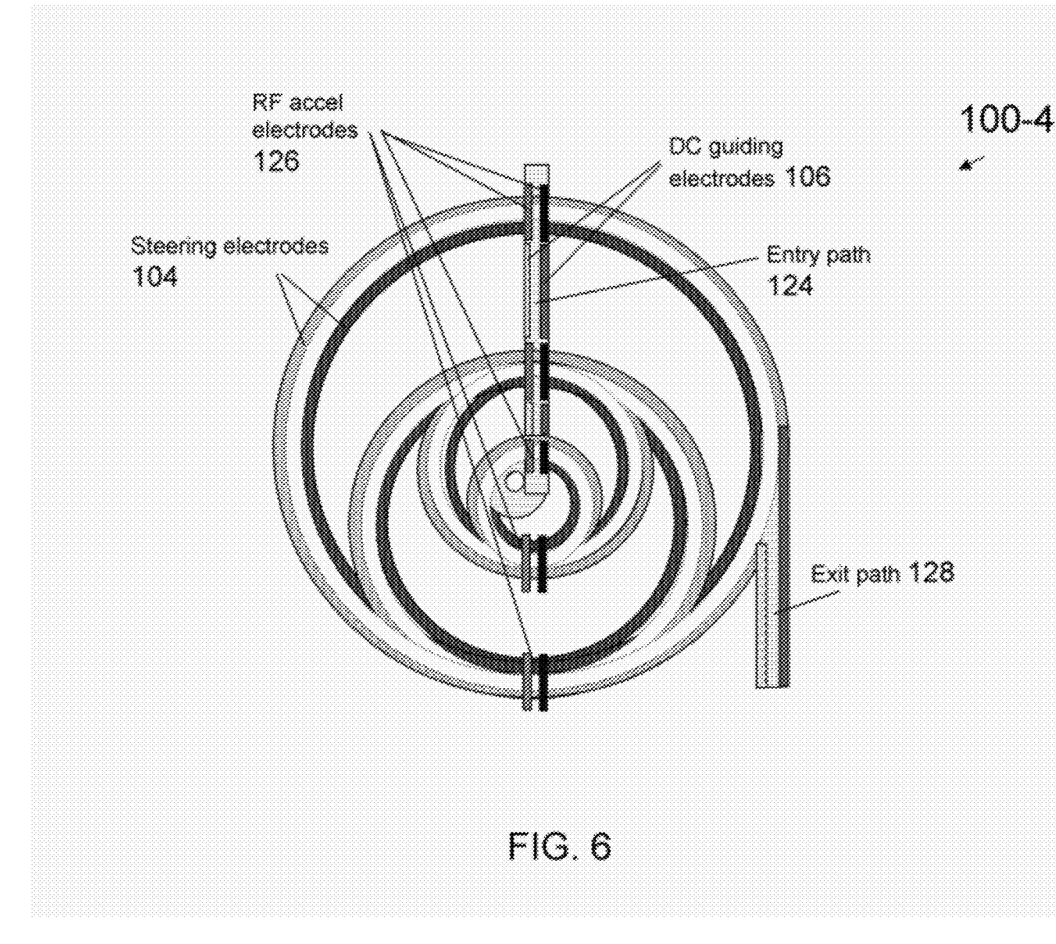
FIG. 6 shows a schematic, top plan view of a particle accelerator according to another aspect of the invention.

FIG. 6 schematically illustrates an alternative particle pathway and electrode configuration aspect of an accelerator 100-4 that also facilitates lower acceleration electrode driving frequency operation as discussed above. As illustrated, the accelerator includes a plurality of pairs of opposing, spaced, curvilinear steering electrodes 104 disposed in the support structure (not shown), each having a particle entry end 301 and a particle exit end 303. The exit end of an $n^{th}$ steering electrode is aligned with the entry end of an $n^{th}+1$ steering electrode. The device further includes a plurality of pairs of RF acceleration electrodes 126, each one of which is disposed at the exit end 303 of an $n^{th}$ steering electrode and the entry end 301 of an $n^{th}+1$ steering electrode.

In the instant aspect, an ion first enters via the entry path 124, being guided by $V_{DC-guide}$ guide electrodes 106. The ion is accelerated at each RF $V_{AC-accel}$ acceleration electrode after which it can stay in a circular path. Thus the $V_{AC-accel}$ acceleration electrodes can be driven at frequencies $$\frac{v}{\pi R n},$$

where v=velocity in a circular trajectory with radius R, and n is an integer number of times the ion goes around each circular path. Hence the frequency can be adjusted and power the minimized. An exit path 128 is aligned with $V_{DC-guide}$ guide electrodes that allow the ion is move in a straight path out of the accelerator.

In the real situation where clusters of ions will be accelerated, the electrostatic Coulomb forces will cause the ions to repel each other. The space-charge forces are most important at lower velocities when the beam density is highest. The spreading-out of ions causes defocusing of the beam and produces a "halo" of high amplitude particles surrounding the main core. The halo ions striking the channel walls will not only cause damage over time but also creates radioactivity.

Figures 7, 8:
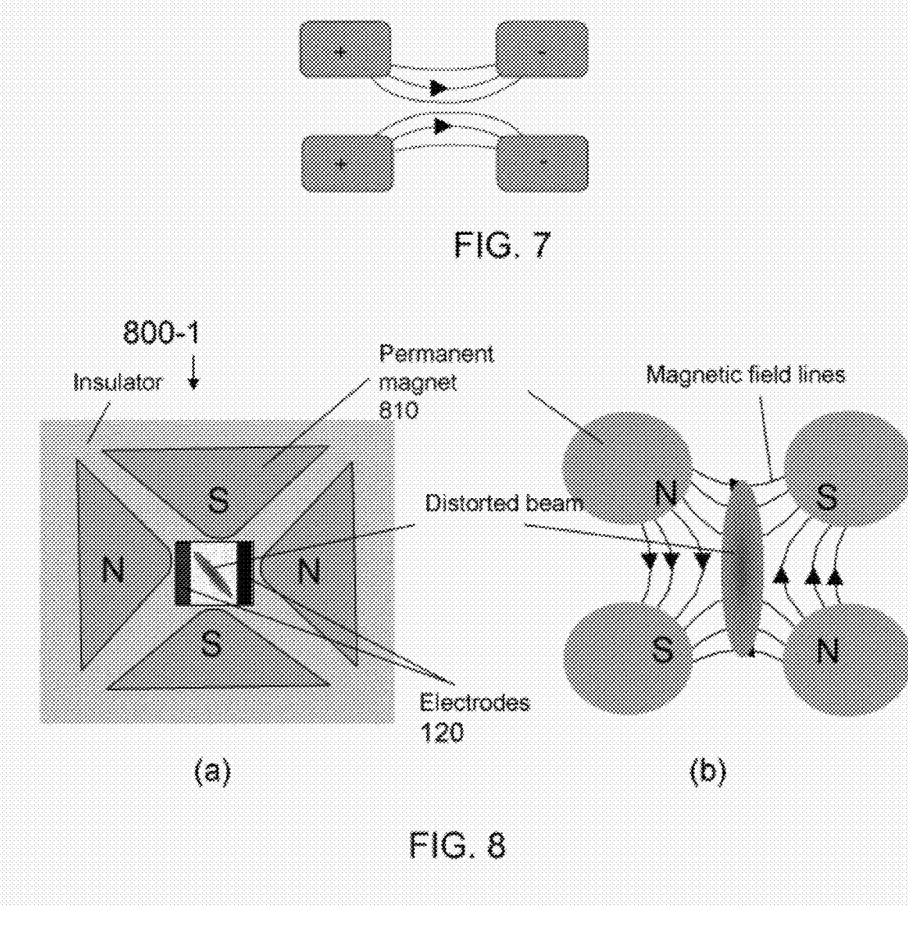
FIG. 7 schematically illustrates an accelerating electrode and the electrical field lines due to beam defocusing at the accelerating electrodes, according to an illustrative aspect of the invention.

Defocusing is enhanced at the accelerating electrodes where there is a non-zero transverse field component, as illustrated in FIG. 7. The time varying field is such that the field amplitude is rising as an ion is injected, so that the particle will see a stronger field in the second half of the gap. The transverse force given to the ion at the accelerating electrodes is approximately $$F_{g,\perp} = \frac{k_l^2}{2}r, \quad k_l^2 = \frac{2\pi q E_0 T \sin(-\phi)}{fv} \qquad (3)$$

Here, $k_l$ is the longitudinal wave number, $E_0$ the accelerating field, $\phi$ is the phase of the ion relative to the RF driving voltage; i.e., if the particle arrives at first electrode later than field amplitude, $\phi$ is negative. T is the transit time factor which is the ratio of the energy gained in a time-varying field versus that gained in a constant field of the same amplitude.

$$T \approx \frac{\sin(\pi\delta/2l)}{\pi\delta/2l}$$

where l is the distance traveled in one period. T is very close to 1 in the cases of current interest. Thus there is a momentum impulse in the transverse direction of r due to the field of $V_{accel}$, and defocusing of the beam occurs. Over a 2 cm distance, the defocus would be about 20 nm for a particle with 110 KeV.

According to an aspect, a magnetic lens may be used to refocus the beam. FIG. 8a shows an exemplary quadrupole magnetic lens 800-1 having four permanent magnets 810. The magnetic lens is disposed about the ion channel at a desired location. In an exemplary aspect, each magnet has a field value B=1.2 T. FIG. 8b is a blow-up of FIG. 8a showing the focusing of the beam in the horizontal direction given the above magnetic field configuration. (The particle is moving out of page).

Figure 9:
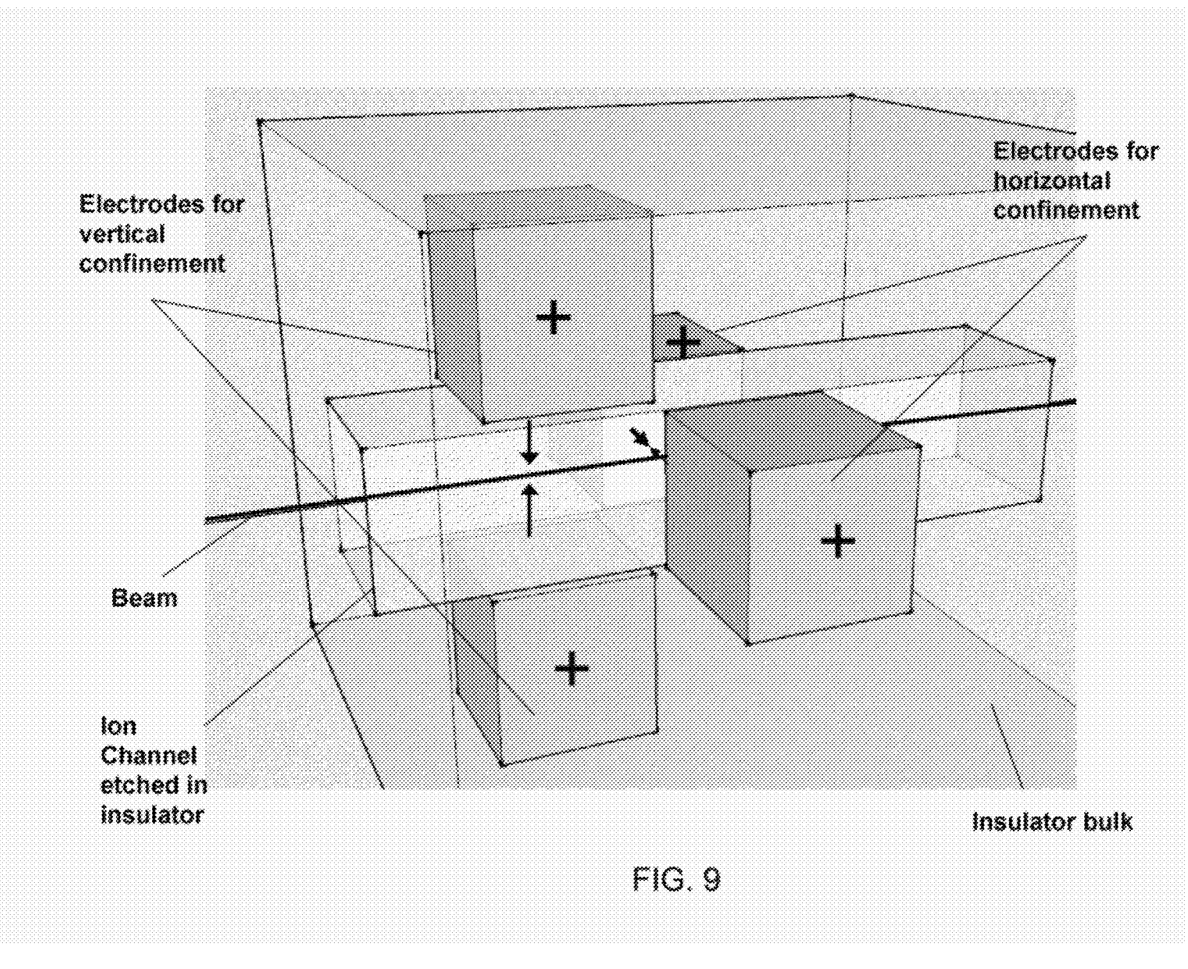
FIG. 9 is a schematic illustration showing a placement of a quadrupole magnetic lens, according to an illustrative aspect of the invention.

Another focusing scheme is the use of the Einzel lens principle: one pair of electrodes (DC) of the same potential (e.g., positive) is placed vertically along the particle path, followed by another pair in the horizontal placed further along the channel as shown in FIG. 9. A positively charged ion beam entering this structure will experience electric forces pushing down from the top and up from the bottom, hence focusing in the vertical direction. The same principle applies in the horizontal direction further along. The applied DC electrode voltages will vary in proportion to the beam energy and beam divergence angle.

Accelerators as embodied are also subject to power losses due primarily to 1) driving an AC voltage $V_{accel}$ across the electrodes; 2) cavity losses inside the accelerating region; and 3) radiation from a circular moving charge. The beam instabilities caused by these losses and other factors may be mitigated with the incorporation of a feedback control circuit. For better efficiency of operation, a integrated circuit compatible feedback circuit could be added to look at the ion current signal at certain segments of the ion path-way, and adjust the guiding electrodes close by to compensate for any beam instabilities there.

The significant size reduction facilitated by the embodiments of the invention makes it possible to fabricate such devices using conventional integrated circuit processes and materials. According to an aspect, spherical or spiral ion channels could be etched in a device layer. On a SOI (silion on insulator) wafer, for example, features in the top layer of doped Si, which is conductive, not only define the channels but could also act as the steering electrodes. In addition, the side walls of the channels could be coated with copper or silver (highest conductivity) for increased performance. The AC accelerating electrodes does not have to be formed at the same time as the steering electrodes depending on the materials used. For ion injection, the same AC electrodes that accelerate the ions in their curvilinear paths could be used to initially guide the ion into the pathways. Timing could be provided by a integrated circuit fabricated on the same wafer to control the voltages.

The gap separation of the steering electrode pair should typically be no less than about 10 μm for every 2 kV for a vacuum pressure of $10^{-6}$ Torr, and 10 μm for every 400V in atmospheric air, in consideration of electrical breakdown limits (which may be adjustable based upon other parameters such as, e.g., vacuum pressure according to the Paschen curve for different electrode materials). The depth of the ion channel may typically range from about 10 μm to 300 μm or more.

More importantly, channel depth (wall height) to width ratio should be equal to or greater than 1:1 and advantageously will be significantly greater than 1:1 for the purpose of eliminating fringing fields in the beam path.

Figure 10:
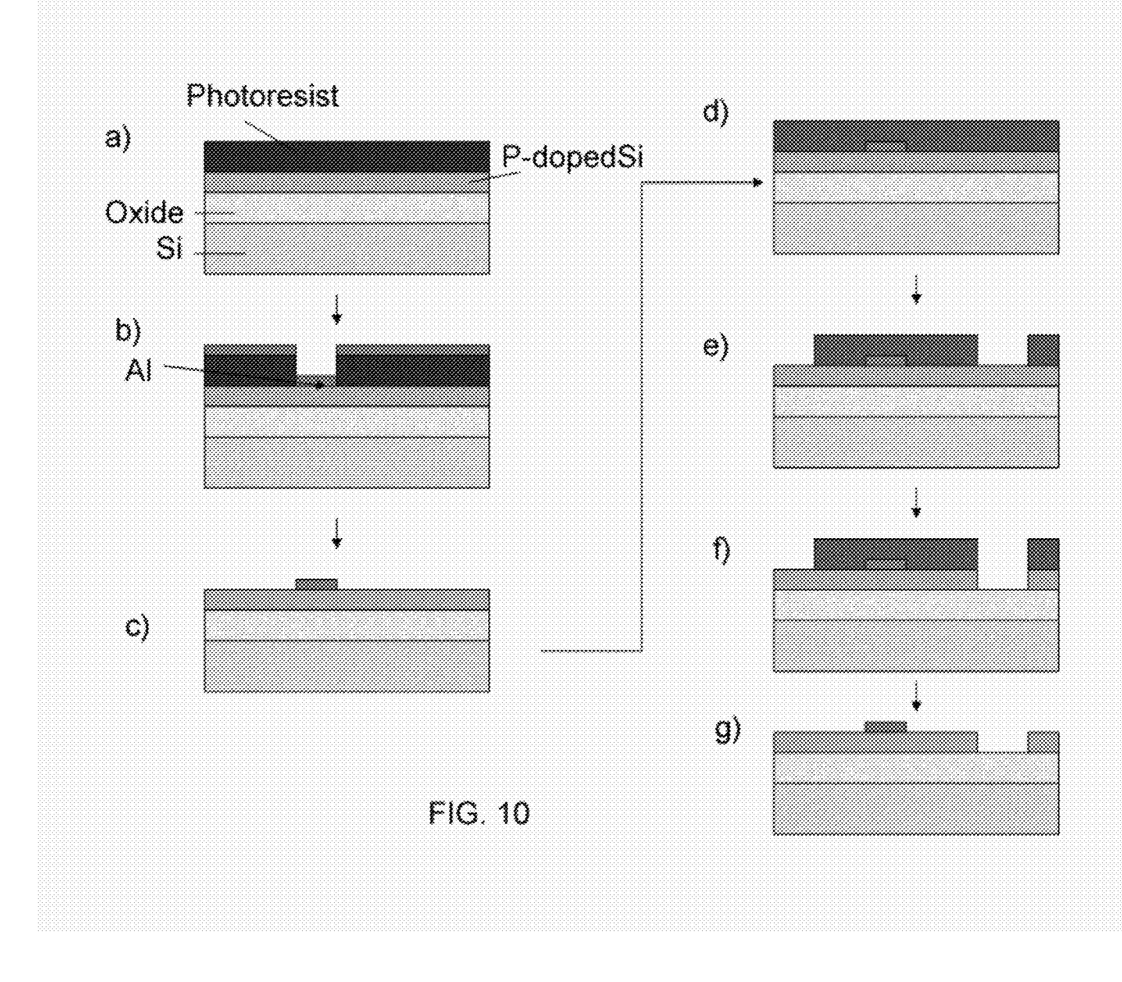

FIGS. 10(a-g) illustrate a basic prototype integrated circuit fabrication process flow for an accelerator according to an exemplary embodiment of the invention. In step (a), a layer of photoresist was spun on a device layer of a p-doped SOI wafer. It will be appreciated that the device layer need not be limited to p-doped Si as other appropriate electrical conducting materials may be used. In step (b), the photoresist was patterned and a layer of Al (with 1% Si) was deposited on top of the photoresist. In (c), the photoresist layer was washed away, along with the Al on top, leaving only the Al, which formed an electrical contact pad. A new layer of photoresist was deposited in step (d). In step (e), the photoresist was patterned to expose the Si that will be etched to form the ion channel, as shown in step (f). The device was completed in step (g) when the photoresist is stripped off.

Figure 11:
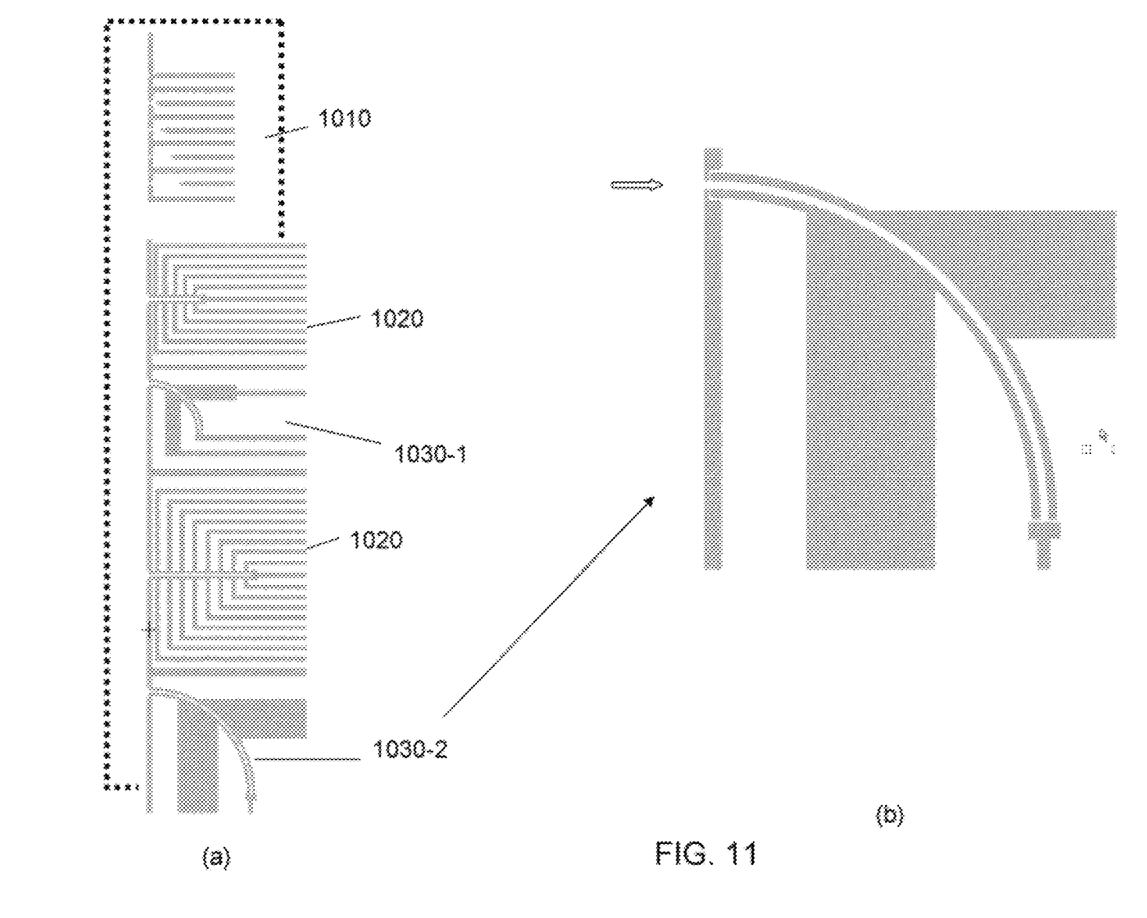

FIG. 11a illustrates the patterned circuit structures for a prototype device according to a non-limiting aspect of the invention. Structure 1010 represents patterned sensing electrodes for aligning the beam from the source into the accelerator. Structures 1020 are patterned electrodes for additional beam alignment and beam profiling. Structures 1030-1 and 1030-2 illustrate curvilinear steering electrodes that provide a 90 degree bend with radii of 200 µm and 400 µm, respectively. FIG. 11b is an enlarged view of structure 1030-2.

Figure 12:
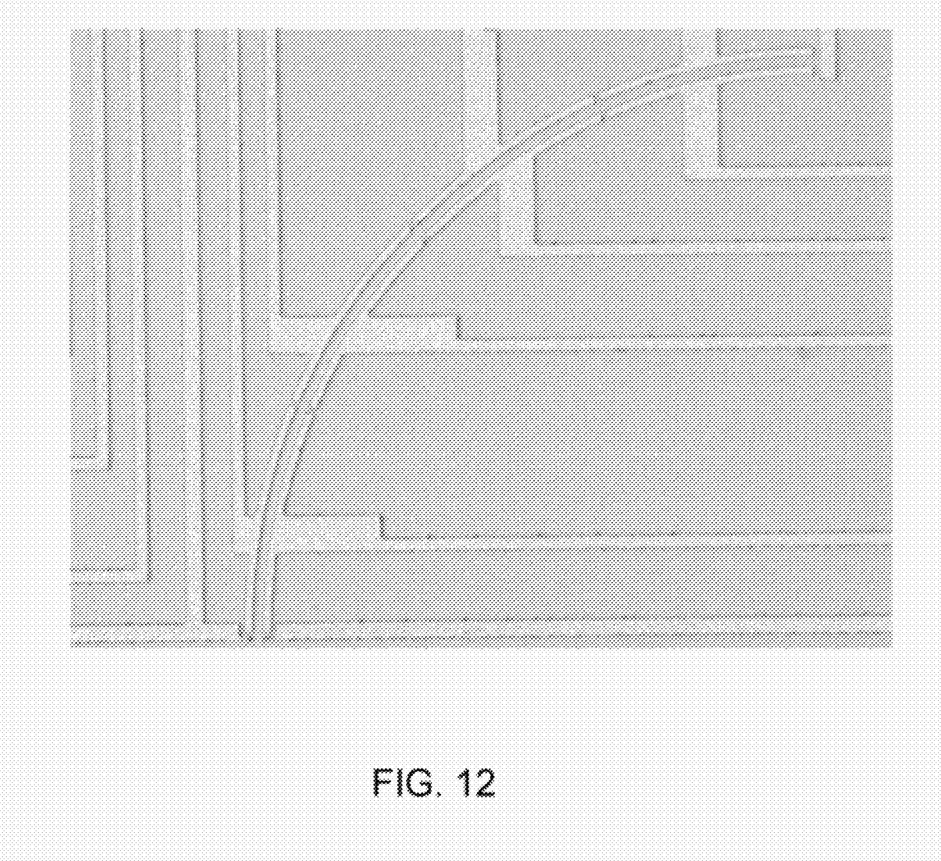
FIG. 12 is a photomicrograph showing a curvilinear ion channel and electrode connections in a conducting, doped-silicon substrate, according to an illustrative aspect of the invention.

FIG. 12 is a top plan view photomicrograph of a fabricated curvilinear electrode structure where the lighter, patterned regions are conducting, doped Si and the darker, background regions are the insulating oxide layer on which the conductors sit.

As described hereinabove, a laterally-directed electric field only is required to control the curvilinear charged particle trajectory. Using both electrical and magnetic forces to control particle trajectory may additionally be advantageous for device miniaturization since the electrical field force and the magnetic field force would add coherently to steer the particles.

Figure 13:
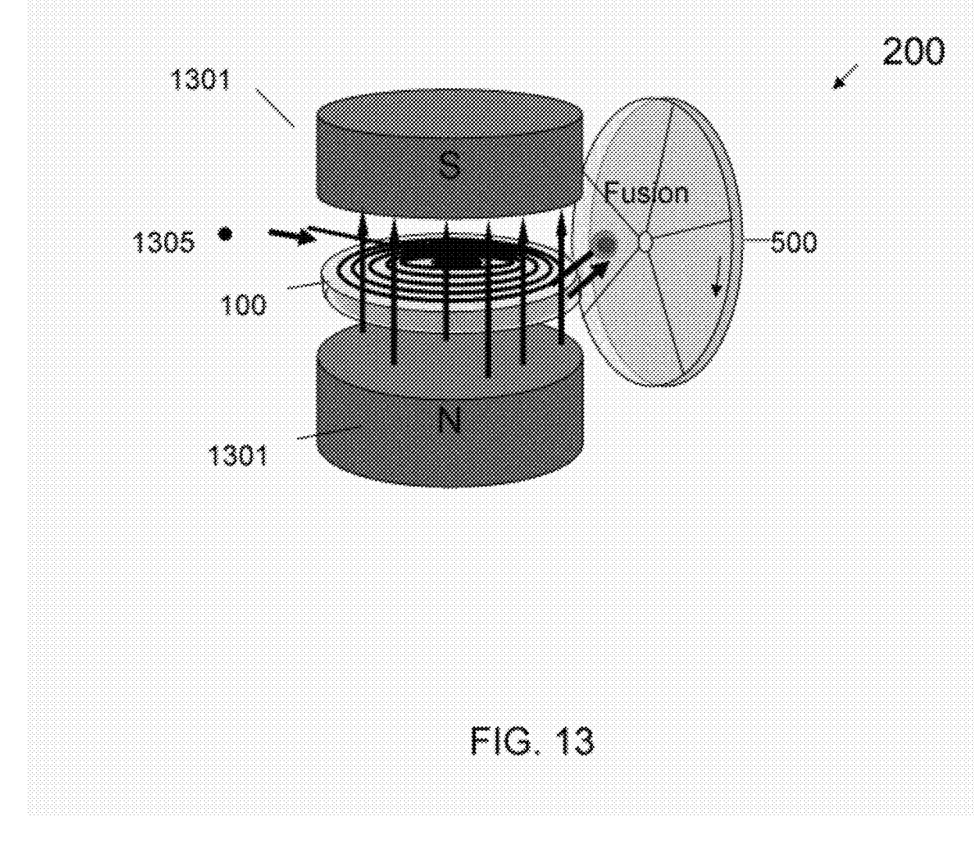
FIG. 13 schematically illustrates a miniature fusion device according to an illustrative embodiment of the invention.

FIG. 13 schematically shows a concept device 200 for achieving a fusion reaction with tritium as follows:

A Deuterium particle 1305 is initially injected into the accelerator at low speed. A chip-scale accelerator 100 as described hereinabove is disposed between two permanent magnets (B=1.2 T) such that the B-field is perpendicular to the principal plane of the accelerator. After the ion is accelerated, it is ejected at into a tritium-holding device 500, which, e.g., could be a rotating wheel made of a thermally conductive material to conduct the heat produced in fusion away to be used.

A fusion apparatus 200 might serve as a miniature neutron and/or X-ray source for applications including interrogation of packages containing fissile material, a high power efficiency source for collimated ionic streams for medical therapy applications, as a device to provide medically and industrially relevant isotopes, and others.

The use of the terms "a" and "an" and "the" and similar references in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. No language in the specification should be construed as indicating any non-claimed element as essential to the practice of the invention.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A charged particle accelerator, comprising:
an accelerator support structure having a principal plane orientation;
a single pair of opposing, spaced, curvilinear steering electrodes disposed in the support structure having a gap there between, which define a particle pathway in the support structure, wherein the steering electrodes are characterized by an adjustable electric field;
a particle entry pathway in the support structure connected to the particle pathway; and
a pair of particle acceleration electrodes disposed in one of the entry pathway and the particle pathway.

2. The charged particle accelerator of claim 1, wherein the steering electrodes are characterized by a constant electric field.

3. The charged particle accelerator of claim 1, wherein the particle pathway has a maximum radius equal to or less than fifteen centimeters.

4. The charged particle accelerator of claim 1, wherein the particle pathway has a maximum radius equal to or less than four centimeters.

5. The charged particle accelerator of claim 1, wherein the particle pathway has a radius equal to or less than 1.0 centimeter.

6. The charged particle accelerator of claim 1, further comprising a particle exit pathway in the support structure connected to the particle pathway.

7. The charged particle accelerator of claim 1, wherein the curvilinear steering electrodes are disposed in a circle.

8. The charged particle accelerator of claim 1, further wherein the support structure is disposed in an evacuable housing.

9. The charged particle accelerator of claim 1, wherein the accelerator support structure is an integrated circuit-compatible substrate.

10. The charged particle accelerator of claim 1, further comprising a magnetic lens disposed in the particle pathway.

11. The charged particle accelerator of claim 1, wherein the particle pathway has a width between about 10 micrometers to about 100 micrometers.

12. The charged particle accelerator of claim 11, wherein the particle pathway has a depth to width ratio greater than or equal to 1:1.

13. The charged particle accelerator of claim 11, wherein the particle pathway has a depth to width ratio in the range between about 1:2 to 1:30.

14. The charged particle accelerator of claim 1, further comprising a pair of DC guide electrodes disposed in the particle entry pathway.

15. The charged particle accelerator of claim 1, wherein the particle acceleration electrodes are operatively characterized by an oscillating field.

16. The charged particle accelerator of claim 1, further comprising a pair of opposing magnets, wherein the support structure is disposed between the magnets, further wherein the particle accelerator is characterized by a uniform magnetic field passing through the support structure normal to the principal plane orientation.

17. The charged particle accelerator of claim 1, further comprising;
a plurality of pairs of opposing, spaced, curvilinear steering electrodes disposed in the support structure, each having a particle entry end and a particle exit end; and
a plurality of pairs of particle acceleration electrodes, each one of which is disposed intermediate an exit end of an $n^{th}$ steering electrode and an entry end of an $n^{th}$ +1 steering electrode.

18. The charged particle accelerator of claim 17, wherein each of the plurality of steering electrodes is characterized by an adjustable, constant electric field.

19. The charged particle accelerator of claim 1, further comprising;
a plurality of opposing, spaced, curvilinear steering electrodes disposed in the support structure, each having a different radius and a common particle entry/exit region; and
a single pair of particle acceleration electrodes disposed in the common particle entry/exit region.

20. The charged particle accelerator of claim 19, wherein each of the plurality of steering electrodes is characterized by an adjustable, constant electric field.

21. The charged particle accelerator of claim 19, wherein the plurality of curvilinear steering electrodes are circular.

22. The charged particle accelerator of claim 1, further comprising;
a plurality of pairs of opposing, spaced, curvilinear steering electrodes disposed in the support structure, each having a particle entry end and a particle exit end, wherein the exit end of an $n^{th}$ steering electrode is aligned with the entry end of an $n^{th}$ +1 steering electrode; and
a plurality of pairs of particle acceleration electrodes, each one of which is disposed at the exit end of an $n^{th}$ steering electrode and the entry end of an $n^{th}$ +1 steering electrode.

23. The charged particle accelerator of claim 22, wherein each of the plurality of steering electrodes is characterized by an adjustable, constant electric field.

24. The charged particle accelerator of claim 22, wherein the plurality of curvilinear steering electrodes are circular.

25. The charged particle accelerator of claim 1, further comprising a sensor adapted to measure a parameter of a bolus of charged particles traveling in the particle pathway.

26. The charged particle accelerator of claim 25, wherein the sensor comprises a feedback control circuit.

27. A method for controlling the path of a charged particle in a particle accelerator, comprising:
providing a charged particle pathway defined by a gap between a pair of opposing, spaced, curvilinear steering electrodes in an accelerator structure;
inputting a traveling charged particle to an entry end of the pathway;
applying a constant voltage across the pair of steering electrodes so as to exert a constant, laterally-directed electric field on the charged particle traveling in the pathway; and
steering the traveling charged particle in a curvilinear trajectory having a maximum radius equal to or less than eight centimeters.

28. The method of claim 27, further comprising providing a set of magnets so as to exert a constant, transversely-directed magnetic field on the charged particle traveling in the pathway.

29. A method for making a chip-scale particle accelerator, comprising:
providing an integrated circuit-compatible planar substrate;
providing an insulating material layer on a principal surface of the substrate;
providing an electrically conducting material layer on the layer of insulating material;
providing an electrical contact to the electrically conducting material layer; and
providing a curvilinear channel in the electrically conducting material layer.

30. The method of claim 29, further comprising providing the curvilinear channel having a channel height to channel width ration equal to or greater than 1:1.

* * * * *